Dec. 16, 1930.   E. V. COULSTON   1,785,182

BASE MEMBER FOR USE WITH COOKING VESSELS

Filed July 11, 1928

INVENTOR:
EARL V. COULSTON

BY George W. Saywell
ATTORNEY

Patented Dec. 16, 1930

1,785,182

UNITED STATES PATENT OFFICE

EARL V. COULSTON, OF SHAKER HEIGHTS, OHIO

BASE MEMBER FOR USE WITH COOKING VESSELS

Application filed July 11, 1928. Serial No. 291,987.

My invention relates to cooking apparatus and particularly to an improved base member for all standard forms of circular pots and pans and other cooking utensils, whereby all the advantages of waterless cooking may be preserved and still permit the use of such standard utensils.

The annexed drawing and the following description set forth in detail certain means embodying my invention, such disclosed means, however, constituting but three of the various forms in which the principle of the invention may be illustrated.

Figure 1:
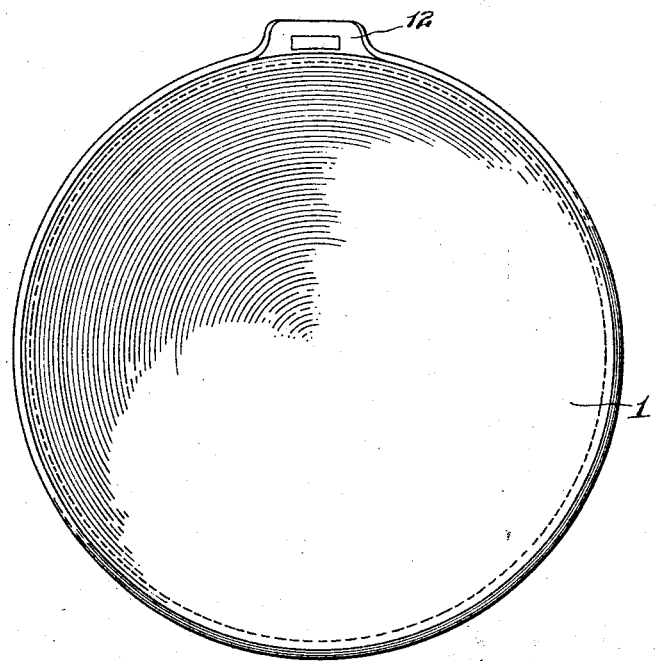
Figure 1 is a top plan of my improved base member.

Waterless cooking or cooking with a very small amount of water is well known, as also its advantages in effecting the saving of the vitamines, mineral salts and vegetable oils contained in raw food products and so beneficial and oftentimes essential to health and life. The difficulty with waterless cooking has been the prevention of boiling down and scorching without the use of complicated and expensive utensils for avoiding these damaging results. My improved base is designed to afford all the advantages of waterless cooking in an economical manner by permitting the use therewith of any of the standard forms of circular cooking utensils, thus rendering the use of especially-designed waterless cookers, as commonly known, unnecessary.

Referring to the accompanying drawing in which the same parts are indicated by the same respective ordinals in the several views, my improved base member consists of a plate 1 preferably of solid cast bronze which is a very efficient heat conductor and is indestructible and non-rusting, although satisfactory bases having the essential advantages of my invention may be made from other metals such as iron and steel. The upper face surface of the plate 1 is concave, being beveled downwardly on all sides gradually and equally to a lowest central point 3, each radius line from the point 3 to the periphery of the plate being a straight line, so that any pot or pan or other common cooking utensil having a plain bottom which is rested upon the upper surface 2 of the plate 1 contacts with this surface by a line contact. The bottom surface of the plate 1 is upwardly inclined from the center 3 to the periphery of the plate. If the cooking utensil is one of smaller diameter than the diameter of the plate 1, such as the utensil 5, Figure 2, the line contact is the outer diameter 6 of the cooking utensil. On the other hand, if the cooking utensil is larger than the plate 1, such as illustrated by the utensil 7, Figure 2, the line contact is the outer diameter 8 of the upper surface 2 of the base 1. In either case a pocket of air 13 is imprisoned above the plate 1 and below the cooking vessel, which air becomes highly but evenly heated and cooks the contents of the vessel, but will not scorch them, and once heated will continue and finish the cooking with a very low flame. The single line contact which I provide between the base and the cooking utensil obviates scorching and burning and the air in the confined air pocket 13 is evenly heated by the good conductivity of the base material and produces efficient cooking, and also avoids scorching even though little or no water is used, the effect of this imprisoned heated air being quite similar to that of steam in a steam-jacketed kettle.

I provide the plate 1 with supporting means downwardly-extended from its lower face, such as the downwardly-extended peripheral flange 4, the vertical height of this supporting flange being greater than the distance by which the center 3 is depressed from the plane containing the peripheral diameter 8, so the plate will rest evenly on any stove surface.

Figure 2:
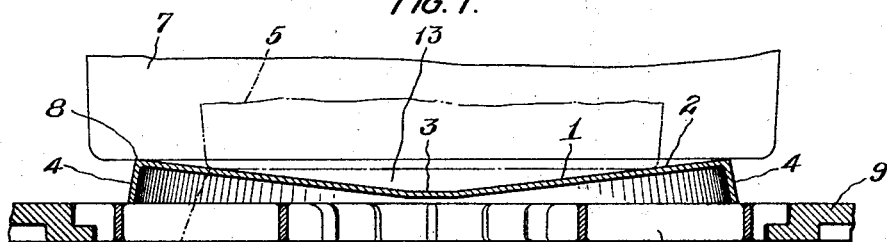
Figure 2 is a vertical section showing the base in use upon a stove top adapted to be heated by a standard burner, a suggestion of two cooking vessels being also included, one in full lines of a diameter larger than the base shown and one in dot-and-dash lines of a diameter smaller than the base shown.

In Figure 2 I have shown the improved base member mounted upon the top 9 of a stove which for purposes of illustration is shown as provided with a spider 10, the heat being derived from an underlying burner 11, two cooking utensils 5 and 7 being indicated, so as to illustrate the application of vessels both smaller and larger than the top of the improved base.

Figure 3:
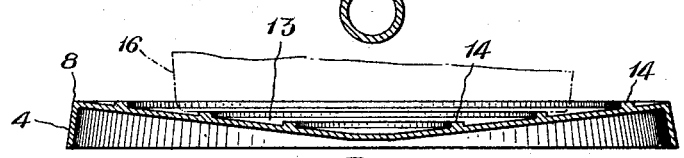
Figure 3 is a vertical section of a modified form of the improved base member, a cooking utensil supported thereon being suggested.
Figure 4:
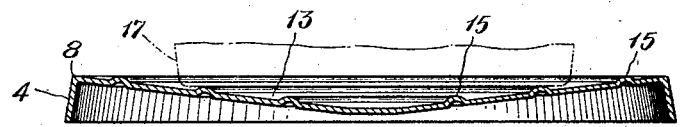
Figure 4 is a vertical section of a second modified form of my improved base member with the suggestion of a cooking vessel supported thereon.

In Figures 3 and 4, I illustrate two modified forms of my improved base member, both of which provide spaced means for supporting cooking utensils of varied sizes, instead of the continuous supporting surface shown in Figure 2, the modification in Figure 3 consisting of spaced annular tongues 14 of rectangular cross-section, providing a contacting surface of material width for the vessel which is suggested at 16, instead of the line contact of Figure 2; and the modification of Figure 4 consisting of spaced annular beads 15, providing spaced contacting surfaces for the vessel suggested at 17, either of line formation or of such material width as desired. In both of the forms of base shown in Figures 3 and 4, the essential features of my invention are provided, which are the imprisonment of a pocket 13 of heated air under any common cooking vessel placed on the base, regardless of size of the vessel, and the keeping of the actual contact of the vessel and the base at a minimum.

All forms of my improved base member are provided with a perforated ear, as shown at 12, Figure 1, to provide for suspension of the member when not in use.

What I claim is:

A base member for use with cooking vessels, consisting of an imperforate plate having a concave upper surface and an upwardly-inclined bottom surface, said upper surface radiating in all directions from its center by the same inclination, and a peripheral supporting flange downwardly-extended from said plate to a point below said center, whereby a circular vessel having a plane bottom will rest upon the plate by a line contact, and whereby an air pocket will be formed within the line of contact and between the plate and vessel.

Signed by me this 6th day of July, 1928.

EARL V. COULSTON.